(12) United States Patent
Yamamoto

(10) Patent No.: US 8,553,296 B2
(45) Date of Patent: Oct. 8, 2013

(54) IMAGE READING APPARATUS

(75) Inventor: Keisuke Yamamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 250 days.

(21) Appl. No.: 13/053,472

(22) Filed: Mar. 22, 2011

(65) Prior Publication Data

US 2011/0242620 A1    Oct. 6, 2011

(30) Foreign Application Priority Data

Mar. 31, 2010    (JP) ................................. 2010-083565

(51) Int. Cl.
H04N 1/04    (2006.01)
(52) U.S. Cl.
USPC ........... 358/474; 358/437; 358/486; 358/488; 358/496; 358/1.12; 358/1.13
(58) Field of Classification Search
USPC ....................................................... 358/488
See application file for complete search history.

(56) References Cited

U.S. PATENT DOCUMENTS

| 6,369,918 | B1 * | 4/2002 | Tom et al. ...................... 358/486 |
| 7,301,680 | B1 * | 11/2007 | Jones ........................... 358/496 |
| 7,889,400 | B2 * | 2/2011 | Akiyama ....................... 358/496 |
| 2003/0193522 | A1 * | 10/2003 | Chandhoke .................. 345/764 |
| 2004/0233467 | A1 * | 11/2004 | Namizuka ..................... 358/1.13 |
| 2006/0039019 | A1 * | 2/2006 | Okamoto ...................... 358/1.12 |
| 2008/0106773 | A1 * | 5/2008 | Akiyama ....................... 358/496 |
| 2009/0237749 | A1 * | 9/2009 | Clouse .......................... 358/474 |
| 2010/0067926 | A1 * | 3/2010 | Akiyama et al. ................. 399/21 |
| 2010/0123751 | A1 * | 5/2010 | Iesaki ............................ 347/16 |
| 2011/0242611 | A1 * | 10/2011 | Nozaki ......................... 358/437 |

FOREIGN PATENT DOCUMENTS

| JP | H08-228267 A | 9/1996 |
| JP | 2008-118368 A | 5/2008 |
| JP | 2008-129063 A | 6/2008 |
| JP | 2009-141523 A | 6/2009 |
| JP | 2010-016639 A | 1/2010 |
| JP | 2010-206536 A | 9/2010 |

* cited by examiner

*Primary Examiner* — King Poon
*Assistant Examiner* — Ted Barnes
(74) *Attorney, Agent, or Firm* — Baker Botts L.L.P.

(57) ABSTRACT

The image reading apparatus conveys a reading unit or a document to read the document. Conveyance is implemented by motor control based on a target position trajectory. The reading unit reads the document each time a line start signal is inputted. When a predetermined condition is satisfied, the reading operation is invalidated. A conveyance position at a timing to start the first reading operation invalidated is specified as an interrupted position. The object is arranged at a conveyance restart position moved back from the interrupted position. A target position trajectory is newly set. A conveyance time from the conveyance restart position to the interrupted position defined by the target position trajectory is an integral multiple of an output cycle of the line start signal. The motor control based on the target position trajectory is started at a timing coinciding with an output timing of the line start signal.

19 Claims, 13 Drawing Sheets

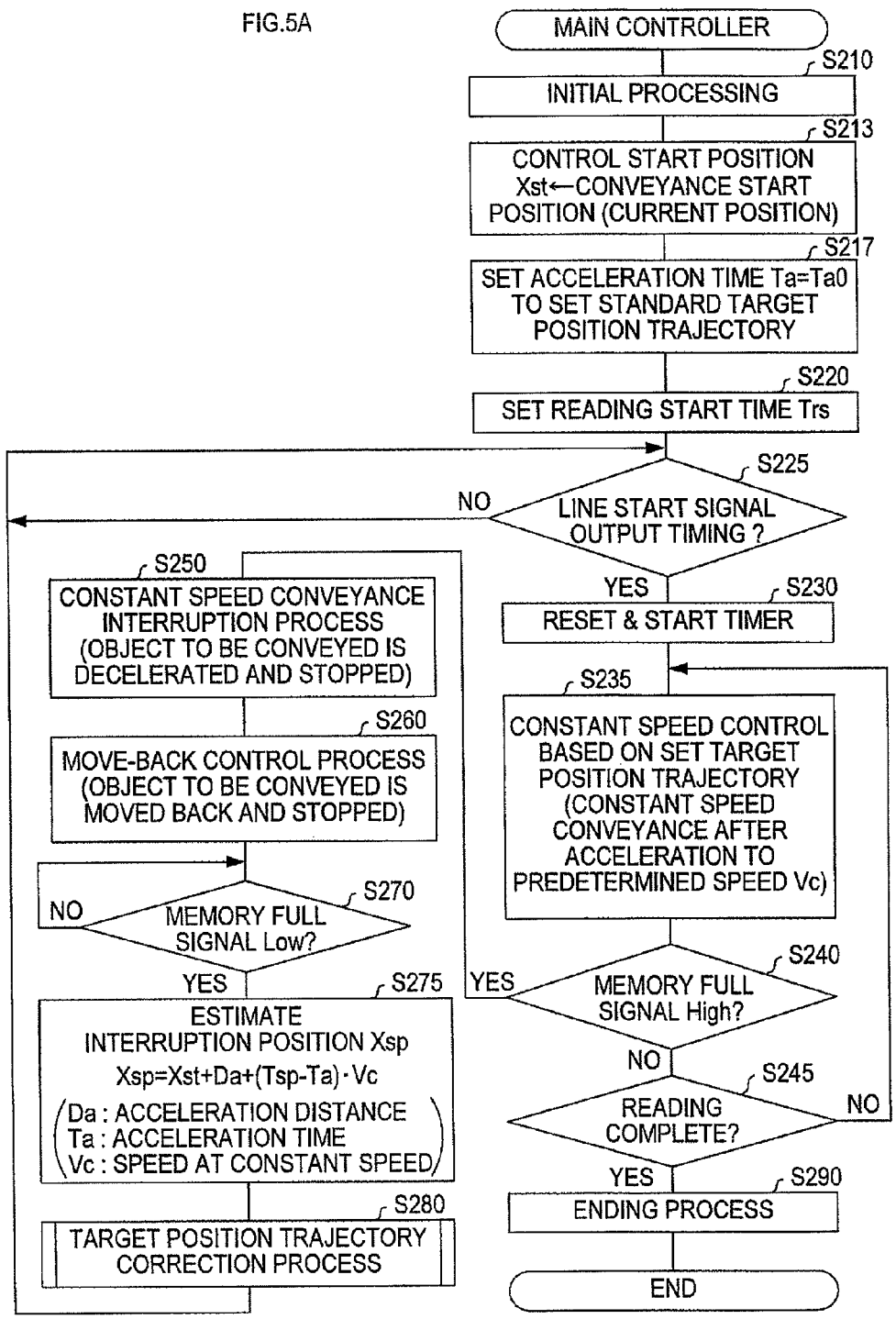

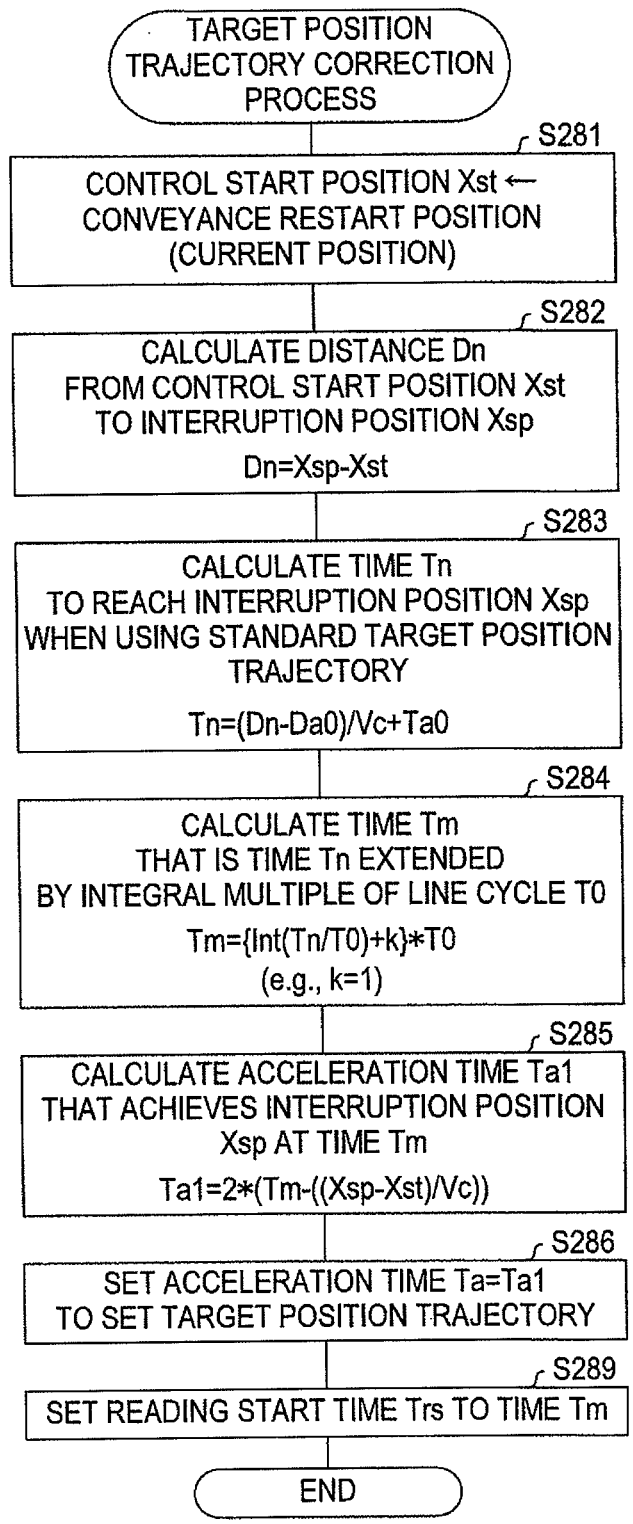

IMAGE READING APPARATUS

CROSS-REFERENCE TO RELATED APPLICATIONS

This application claims the benefit of Japanese Patent Application No. 2010-083565 filed Mar. 31, 2010 in the Japan Patent Office, the disclosure of which is incorporated herein by reference.

BACKGROUND

This invention relates to an image reading apparatus.

Conventionally known image reading apparatus are image reading apparatus of flatbed (FB) type and image reading apparatus of auto document feeder (ADF) type. The image reading apparatus of FB type reads a document by conveying in a sub-scanning direction a line sensor that can read image in a main scanning direction. The image reading apparatus of ADF type reads a document by conveying a document in a sub-scanning direction with a fixed line sensor. In these image reading apparatus, the document or the line sensor is conveyed so that a relative position between the document and the line sensor is changed at a constant speed. During the constant speed conveyance, the line sensor executes reading operation per predetermined time period so as to generate line image data which indicates a read image per line. Read image data indicating a read image of a document is generated by combining these line image data.

Among the above-described image reading apparatus, it is also known that there are image reading apparatus which transmit the line image data downstream after temporarily accumulating the line image data in a buffer. In such image reading apparatus, the buffer becomes full if there is a delay in processing downstream of the buffer in a data transmission path. Thus, in case that the buffer becomes or is likely to become full, document reading by constant speed conveyance is temporarily interrupted. The position where the document reading has been interrupted is stored in a memory. When a free space is created in the buffer, the document reading by the constant speed conveyance is restarted from the interrupted position.

The following technique is known in order to accurately restart the document reading from the interrupted position. For example, the known technique provides a line start signal which is synchronous with an encoder signal to the line sensor. The encoder signal is outputted from an encoder in accordance with a move of the line sensor. The line sensor executes the reading operation each time the line start signal is inputted, thereby to generate each of the line image data. If the line start signal is synchronous with the encoder signal, the interrupted position can be accurately specified from the encoder signal. Therefore, according to this technique, the document reading can be accurately restarted from the interrupted position. Furthermore, image degradation is inhibited which is due to difference between the interrupted position and the restart position.

SUMMARY

In the conventional technique which inhibits image degradation due to difference between the interrupted position and the restart position by providing the line start signal synchronous with the encoder signal, it is necessary to adapt a reading resolution (distance in a sub-scanning direction per line) to an encoder resolution (distance per pulse). In order to increase the reading resolution, an encoder with high resolution has to be used. Then, the costs for manufacturing the image reading apparatus become high. Also, in the above-described method utilizing synchronous signals, when fluctuation in speed of an object to be conveyed occurs due to a control error, a cycle of the encoder signal is fluctuated and so is a cycle of the line start signal. For this reason, in this method, image degradation of the read image data occurs due to fluctuation of the line start signal.

Accordingly, in one aspect of the present invention, it would be desirable that image degradation of the read image data due to interruption of a process related to document reading can be inhibited without making the line start signal synchronous with the encoder signal.

An image reading apparatus in one aspect of the present invention includes a signal output unit, a reading unit, a conveyance unit, a position detecting unit, a controller, a target setting unit, a mode switching unit, and a position specifying unit.

The signal output unit periodically outputs a line start signal. The line start signal functions as a signal which defines a timing to start a reading operation.

The reading unit executes an operation, as the reading operation, of reading a document in a main scanning direction, each time the line start signal is provided from the signal output unit. As a result of the reading operation per input of the line start signal as such, the reading unit generates line image data per line which indicates a read image of the line.

The conveyance unit has a motor, and conveys an object to be conveyed with a driving force generated by the motor. Particularly, the conveyance unit conveys one of the reading unit and the document in a sub-scanning direction as the object to be conveyed.

The position detecting unit detects a conveyance position of the object to be conveyed by the conveyance unit.

The controller controls the motor based on the conveyance position of the object to be conveyed detected by the position detecting unit and a predetermined first target position trajectory. With this motor control, the controller controls the conveyance unit to accelerate the object to be conveyed to follow a position trajectory corresponding to the first target position trajectory from a conveyance start position up to a predetermined speed. After the acceleration, the controller controls the conveyance unit to convey the object to be conveyed at a constant speed.

The target setting unit sets to the controller a target position trajectory which starts from the conveyance start position, as the first target position trajectory.

The mode switching unit invalidates the reading operation by the reading unit when a predetermined interruption condition is satisfied.

The position specifying unit specifies, as an interrupted position, the conveyance position of the object to be conveyed at a time Tf when the line start signal which defines the timing to start the first reading operation invalidated by the mode switching unit, among the line start signals outputted from the signal output unit, is outputted.

The controller interrupts the constant speed conveyance of the object to be conveyed when the interruption condition is satisfied, and controls the motor to stop the object to be conveyed.

The controller, after the object to be conveyed is stopped, controls the motor based on the conveyance position of the object to be conveyed detected by the position detecting unit. With this motor control, the controller disposes the object to be conveyed at a conveyance restart position moved back from the interrupted position by a predetermined distance.

Further, after the interruption condition is satisfied, the target setting unit and the mode switching unit operate as follows.

Particularly, after the interruption condition is satisfied, the target setting unit sets to the controller a target position trajectory which starts from the conveyance restart position, as a second target position trajectory. In detail, the target setting unit adjusts a position trajectory of an acceleration section included in the second target position trajectory. Thereby, the second target position trajectory is adjusted such that a conveyance time from the conveyance restart position to the interrupted position is an integral multiple of an output cycle of the line start signal. The target setting unit sets the second target position trajectory adjusted as such to the controller.

The controller, after the interrupted condition is satisfied and when a predetermined restart condition is satisfied, starts control of the motor based on the second target position trajectory at a timing which coincides with a timing when the line start signal is outputted from the signal output unit. With the motor control started as such, the controller controls the conveyance unit to accelerate the object to be conveyed from the conveyance restart position up to the predetermined speed, to follow a position trajectory corresponding to the second target position trajectory, and, after the acceleration, the controller controls the conveyance unit to convey the object to be conveyed at the constant speed.

The mode switching unit, when the restart condition is satisfied, validates the reading operation as follows. At a timing when the object to be conveyed reaches the interrupted position by the motor control based on the second position trajectory, the line start signal is inputted. The mode switching unit validates the reading operation executed by the reading unit based on and after this line start signal.

BRIEF DESCRIPTION OF THE DRAWINGS

The invention will now be described below, by way of example, with reference to the accompanying drawings, in which:

FIG. 5A is a flowchart illustrating a process executed by a main controller.

FIG. 8 is a flowchart illustrating a target position trajectory correction process executed by the main controller;

DETAILED DESCRIPTION OF THE PREFERRED EMBODIMENT

Figure 1:
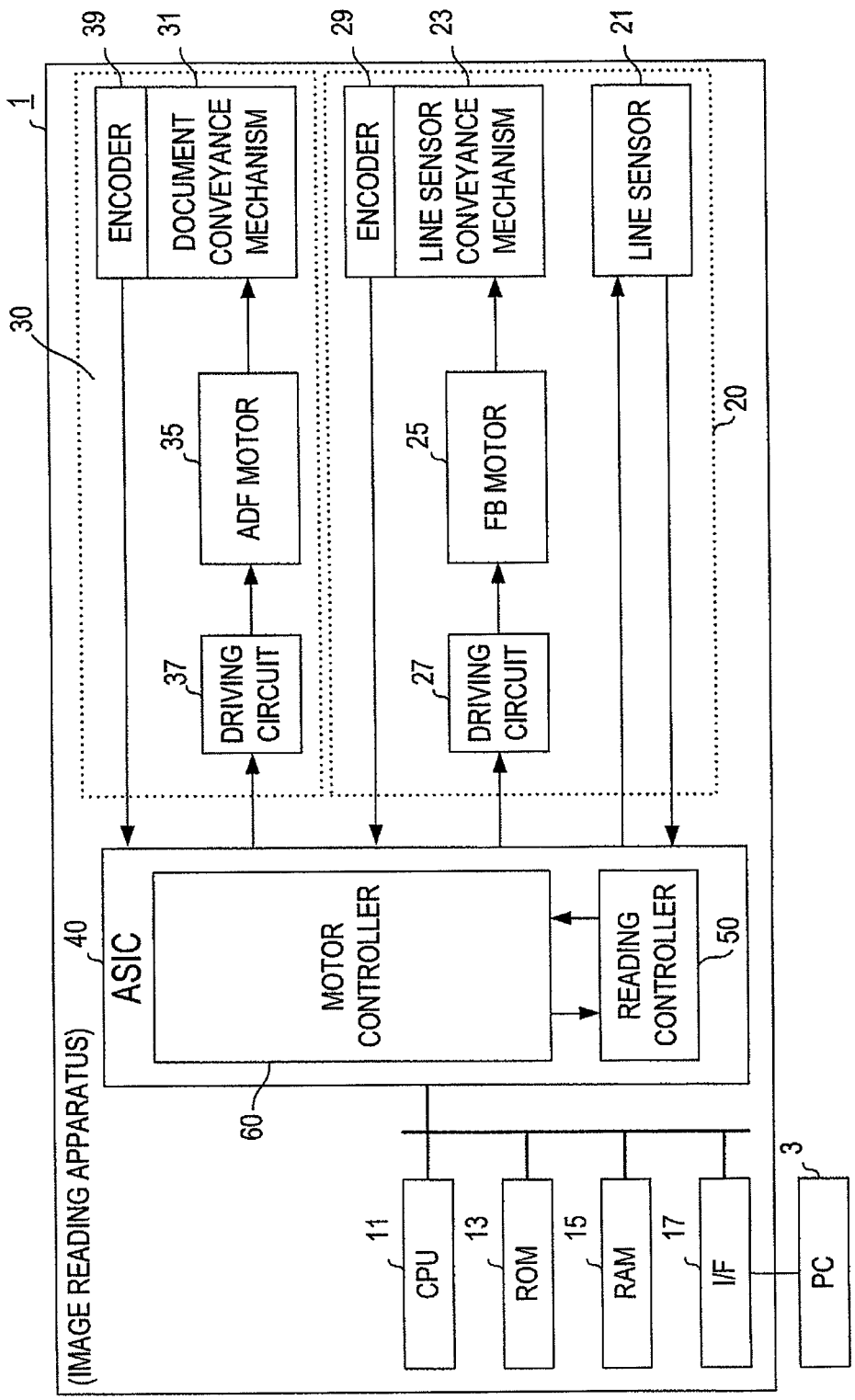
FIG. 1 is a block diagram showing an electrical constitution of an image reading apparatus.

As shown FIG. 1, an image reading apparatus 1 of the present embodiment includes a CPU 11, a ROM 13, a RAM 15, an interface 17, a FB (flatbed) scanner 20, an auto document feeder (ADF) 30, and an ASIC 40. The ROM 13 is a nonvolatile memory that stores programs executed by the CPU 11. The RAM 15 is a volatile memory used as a work area when the CPU 11 executes the programs. The interface 17 functions as an interface which can communicate with an external personal computer (PC). The FB scanner 20 is a device that conveys a line sensor 21 to read a document to be read. The ADF 30 is a device that conveys the document. The ASIC 40 is a control circuit which controls the FB scanner 20 and the ADF 30.

In the image reading apparatus 1, the CPU 11, based on a read command provided from the external PC 3 via the interface 17, executes a process pertaining to document reading. At this time, the CPU 11 sets operation parameters to the ASIC 40 to start the ASIC 40.

Operation parameters indicate reading modes, reading resolutions, reading areas, and so on. As the reading modes, there are an ADF reading mode and a FB reading mode. The ADF reading mode is a mode in which the line sensor 21 is arranged in a fixed manner and a document to be read is conveyed, thereby to read the document. In the ADF reading mode, the document is read with a relative position being changed between the line sensor 21 and the document as such. The FB reading mode is a mode in which the line sensor 21 is conveyed, thereby to read a stationary document placed on a platen glass 103A. In the FB reading mode, the document is read with a relative position being changed between the line sensor 21 and the document as such.

The ASIC 40 controls the FB scanner 20 and/or the ADF 30 according to the operation parameters and changes the relative position between the document and the line sensor 21 in the above-described manner. Further, the ASIC 40 makes the line sensor 21 execute periodic reading operation. The line sensor 21 generates line image data indicating a result of reading one line of the document per reading operation. The ASIC 40 performs shading correction, etc. to each line image data generated as such and outputs the corrected line image data.

Each corrected line image data outputted from the ASIC 40 is stored in the RAM 15. Thereby, in the RAM 15, read image data constituted from the line image data and indicating a result of reading the document is generated. The CPU 11 transmits the read image data stored in the RAM 15 via the interface 17 to the PC 3. For example, the CPU 11, after the read image data for one page is accumulated in the RAM 15, transmits the read image data for one page to the PC 3. The read image data generated in the RAM 15 may be sequentially transmitted to the PC 3 while the read image data for one page is being stored in the RAM 15. In this manner, the CPU 11 provides the read image data indicating the result of reading the document to the PC 3.

Next, a description will be given on detailed constitutions of the FB scanner 20, the ADF 30 and the ASIC 40. The FB scanner 20 includes the line sensor 21, a line sensor conveyance mechanism 23, a FB motor 25, a driving circuit 27, and an encoder 29. The line sensor 21 reads the document to be read in a main scanning direction. The FB motor 25 is a direct current motor that supplies power to the line sensor conveyance mechanism 23. The FB motor 25 is driven by the driving circuit 27. The line sensor conveyance mechanism 23 receives the power from the FB motor to convey the line sensor 21. The encoder 29 is installed in a mechanism which transmits power from the FB motor 25 to the line sensor 21, and outputs a pulse signal (encoder signal) in accordance with a move of the line sensor 21 in a sub-scanning direction. Hereinafter, the encoder 29 is referred to as the "FB encoder" as well. The FB encoder 29, for example, may be a rotary encoder.

Figure 2:
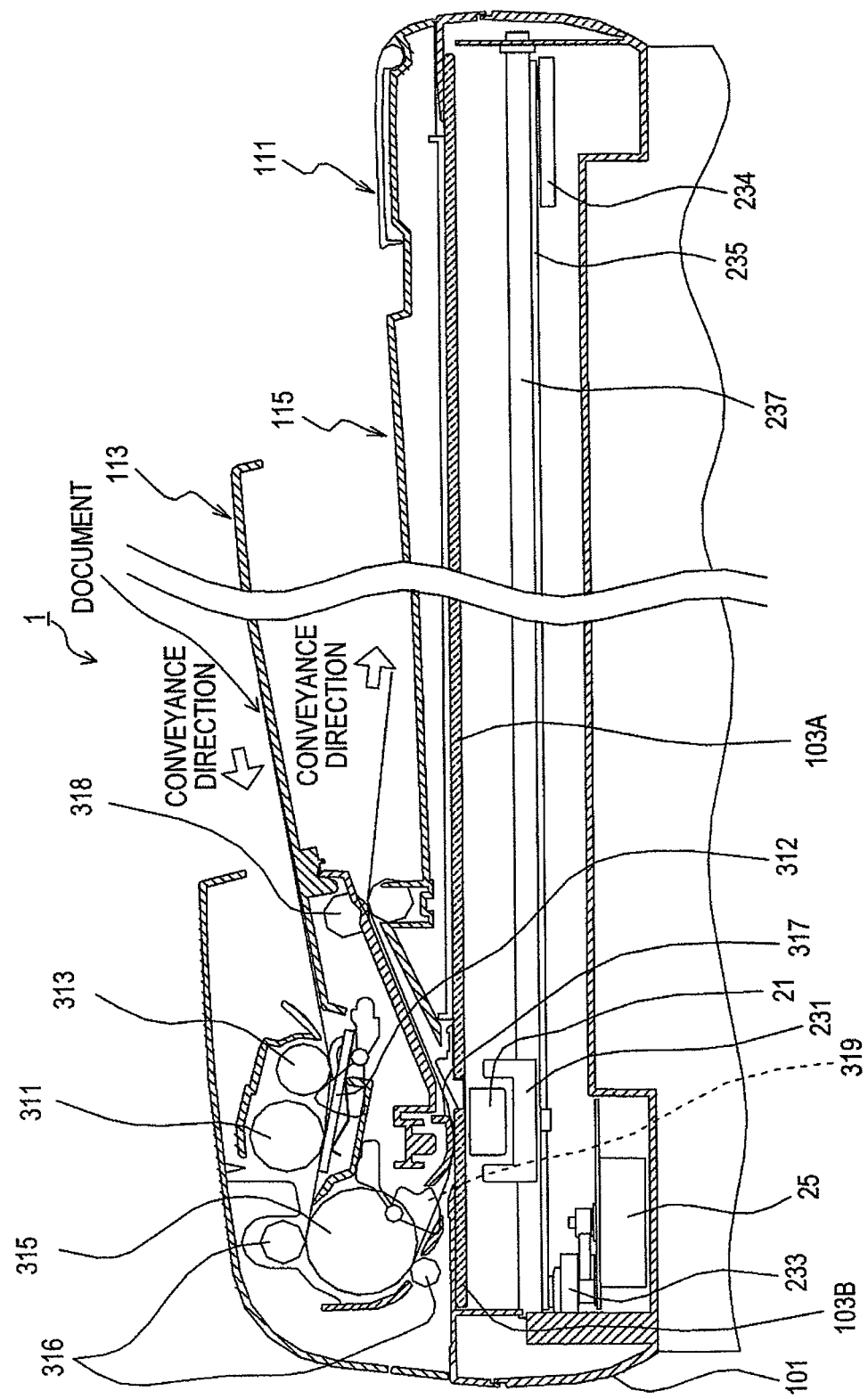
FIG. 2 is a cross sectional view showing a mechanical constitution of the image reading apparatus.

The line sensor conveyance mechanism 23, as shown in FIG. 2, is provided inside a lower case 101 of the image reading apparatus 1. The lower case 101 of the image reading apparatus 1 is provided with transparent platen glasses 103A and 103B on a top surface thereof. On a top surface of the platen glass 103A, a document to be read is placed by a user in the FB reading mode. The platen glass 103B is used in the ADF reading mode. In the ADF reading mode, the line sensor 21 is arranged in a fixed manner in an area below the platen glass 103B.

The line sensor conveyance mechanism 23 is provided in an area below the platen glasses 103A and 103B in such a manner as to be able to convey the line sensor 21, which extends in the main scanning direction, in the sub-scanning direction. The line sensor conveyance mechanism 23 includes a carriage 231 mounting the line sensor 21 thereon, a driving pulley 233, a driven pulley 234, and a belt 235. The carriage 231 is connected to the belt 235 wound around the driving pulley 233 and the driven pulley 234. To the driving pulley 233, the FB motor 25 is connected via a gear.

Particularly, in the line sensor mechanism 23, the driving pulley 233 receives the power from the FB motor 25 to rotate. In response to rotation of the driving pulley 233, the belt 235 and the driven pulley 234 are rotated. By the rotation of the belt 235, the power of the FB motor 25 is transmitted to the carriage 231 connected to the belt 235. The carriage 231 is restricted to move only in the sub-scanning direction by a guide shaft 237. Accordingly, the carriage 23 which receives this power moves in the sub-scanning direction. The line sensor conveyance mechanism 23 conveys the line sensor 21 mounted on the carriage 231 based on the above-described principle. The FB encoder 29, for example, is attached to a rotation shaft of the driving pulley 233 or of the FB motor 25 so as to output an encoder signal in accordance with the move of the line sensor 21 in the sub-scanning direction.

The ADF 30 includes a document conveyance mechanism 31, an ADF motor 35, a driving circuit 37, and an encoder 39. The ADF motor 35 is a direct current motor that supplies power to the document conveyance mechanism 31. The ADF motor 35 is driven by the driving circuit 37. The encoder 39 is an encoder that outputs a pulse signal (encoder signal) in accordance with an amount of document feeding. Hereinafter, the encoder 39 is referred to as the "ADF encoder" as well. The ADF encoder 39, for example, may be a rotary encoder.

The document conveyance mechanism 31, as shown in FIG. 2, is provided in an upper case 111 that is rotatably provided to the lower case 101 of the image reading apparatus 1. The upper case 111 functions as a cover body that covers the top surface of the lower case 101 which includes the platen glasses 103A and 103B. The document conveyance mechanism 31 provided in the upper case 111 includes a separation roller 311, a separation pad 312, a suction roller 313, a main roller 315, a pair of pinch rollers 316, a document presser 317, a discharge roller 318, and a document sensor actuator 319. The separation pad 312 is arranged to face the separation roller 311 to apply a conveyance resistance to the document. The suction roller 313 sends out the document stacked on a document tray 113, provided in the upper case 111, to the separation roller 311 by rotation.

The main roller 315 applies a conveyance force to the document by converting a conveyance direction of the document conveyed from the separation roller 311 toward the side of the platen glass 103B by rotation. The pair of pinch rollers 315 press the document against the main roller 315.

The above rollers 311, 313, 315 and 318 constituting the document conveyance mechanism 31 receives power from the ADF motor 35 to be rotated in conjunction with each other. By the rotation, a force in the sub-scanning direction is applied to the document. As a result, the document is conveyed from the document tray 113 to the discharge tray 115 by an amount corresponding to an amount of rotation of the rollers 311, 313, 315 and 318.

The document presser 317 presses the document which passes below itself toward the side of the platen glass 103B. The line sensor 21 is arranged below the document presser 317 in the ADF reading mode and reads the document passing below the document presser 317 on the platen glass 103B. The document sensor actuator 319 is arranged upstream of the document presser 317 and detects whether or not the document has passed by.

The ADF encoder 39 is installed in a mechanism (e.g., rotation shaft of the ADF motor 35) which transmits power from the ADF motor 35 to the above-described rollers. In this state, the ADF encoder 39 outputs a pulse signal (encoder signal) in accordance with rotation of the ADF motor 35 and of the above-described rollers. In the present embodiment, the ASIC 40 detects a conveyance position of the document based on an on/off signal from the document sensor actuator 319 and an encoder signal outputted from the ADF encoder 39.

Figure 3:
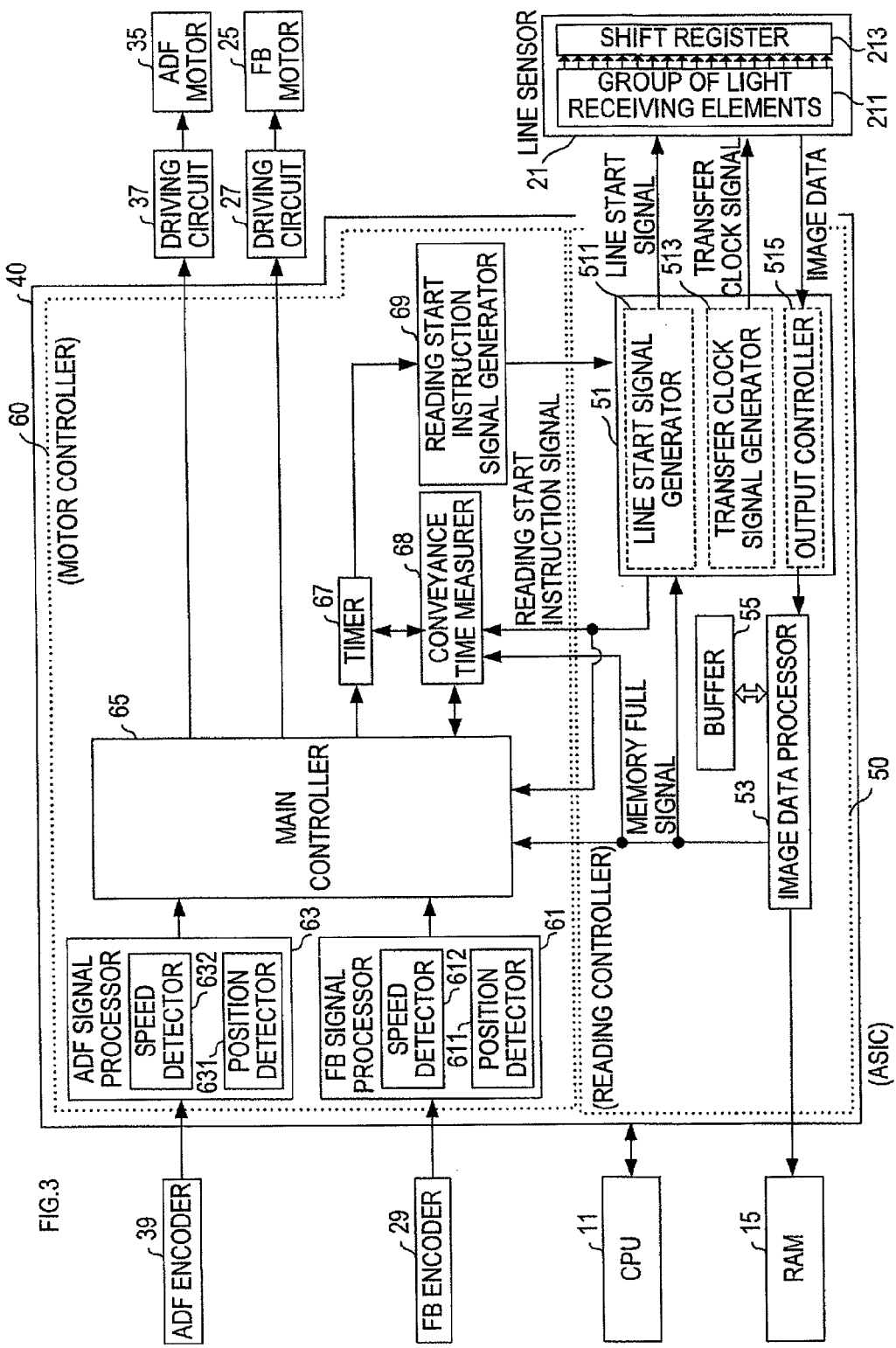
FIG. 3 is a block diagram showing an internal constitution of an ASIC.

Next, the detailed constitution of the ASIC 40 will be explained by way of FIG. 3. The ASIC 40 includes a reading controller 50 and a motor controller 60. The motor controller 60 controls the FB motor 25 and the ADF motor 35. The reading controller 50 is provided with a reading front end 51, an image data processor 53 and a buffer 55. The reading controller 50 controls reading of the document via the line sensor 21.

In detail, the reading front end 51 is provided with a line start signal generator 511, a transfer clock signal generator 513, an output controller 515, and so on. The line start signal generator 511 periodically outputs a line start signal at a predetermined cycle T0 (hereinafter, referred to as a "line cycle T0" as well). The line start signal defines a timing to start the reading operation by the line sensor 21. The line cycle T0 is set in a not shown register. The line cycle T0 is a parameter which affects the reading resolution. The line start signal outputted at the line cycle T0 is provided to the line sensor 21.

The line sensor 21 is provided with a group of light receiving elements 211 and an analog shift register 213 The group of light receiving element 211 includes a light receiving element per pixel. The analog shift register 213 is configured as an analog shift register in size corresponding to the number of the light receiving elements of the group of light receiving elements 211.

In this line sensor 21, when the line start signal is inputted, signal charge stored in each light receiving element is transferred to the analog shift register 213. Thereby, in the analog shift register 213, the line image data, indicating a result of reading until input of the line start signal is stored. In other words, the analog shift register 213 holds signal charge information of each pixel (pixel data) per line provided from the group of light receiving elements 211 as the line image data. Also, by the input of the line start signal, the signal charge of each light receiving element is reset. New reading operation utilizing photoelectric effect is started. In the line sensor 21, the reading operation is achieved by accumulating operation of the signal charge which utilizes photoelectric effect by the group of light receiving elements 211.

The transfer clock signal generator 513, per input of the line start signal from the line start signal generator 511 to the line sensor 21, provides a transfer clock signal to the line sensor 21. The transfer clock signal is a signal for making the analog shift register 213 output the line image data (analog data corresponding to the signal charge). With the input of the transfer clock signal, the line image data stored in the analog shift register 213 is outputted to the output controller 515 from the analog shift register 213 during a period until the next line start signal is inputted. Hereinafter, the period from when a line start signal is provided until the next line start signal is provided is also referred to as a "line reading period".

The output controller 515 converts the line image data provided from the line sensor 21 to digital data, and transfers the converted line image data (digital data) to the image data processor 53. Among the line image data provided from the line sensor 21, the output controller 515 transfers the line image data which satisfy a predetermined condition to the image data processor 53, and destroys the line image data which do not satisfy the predetermined condition without transfer to the image data processor 53.

Particularly, the output controller 515 transfers the line image data generated in the line sensor 21 by the reading operation as follows, without destruction, to the image data processor 53. That is, the line image data generated during each line reading period from when a High-level signal is provided from the motor controller 60 as a reading start instruction signal (details will be explained later) to when a High-level signal is provided from the image data processor 53 as a later-described memory full signal. On the other hand, the output controller 515 destroys the line image data based on the signal charge accumulated in the group of light receiving elements 211 before the High-level signal is provided as the reading start instruction signal. The output controller 515 also destroys the line image data based on the signal charge accumulated in the group of light receiving elements 211 after the High-level signal is provided as the memory full signal.

Particularly, the output controller 515 regards as valid the reading operation during and after the first line reading period after the High-level signal is provided as the reading start instruction signal. The output controller 515 provides to the image data processor 53 the line image data sequentially generated in the line sensor 21 from the line image data outputted from the line sensor 21 after the end of the first line reading period.

Also, the output controller 515 destroys the line image data based on the reading operation during each line reading period after the line start signal is provided to the line sensor 21 for the last time before the High-level signal is provided as the memory full signal, thereby to invalidate the reading operation thereafter. As a result, the line image data generated by the invalid reading operation is not provided to the image data processor 53, and is not used as a component of the read image data to be generated in the RAM 15.

Also, the image data processor 53 applies image processing such as shading correction, gamma correction, and so on, to the line image data provided from the output controller 515 and outputs the line image data after the correction by these image processing. The corrected line image data is stored in the RAM 15. Thereby, in the RAM 15, the read image data indicating a result of reading the document which is constituted by a combination of the corrected line image data. The line image data until outputted from the image processor 53 is temporarily stored in the buffer 55.

In the reading controller 50, a memory with large storage capacity cannot be installed as the buffer 55 because of the manufacturing cost. Therefore, in the reading controller 50, the buffer 55 may become full due to delay in image processing or the like. In an event as such, the line image data newly outputted from the reading front end 51 cannot be stored in the buffer 55.

Figure 4:
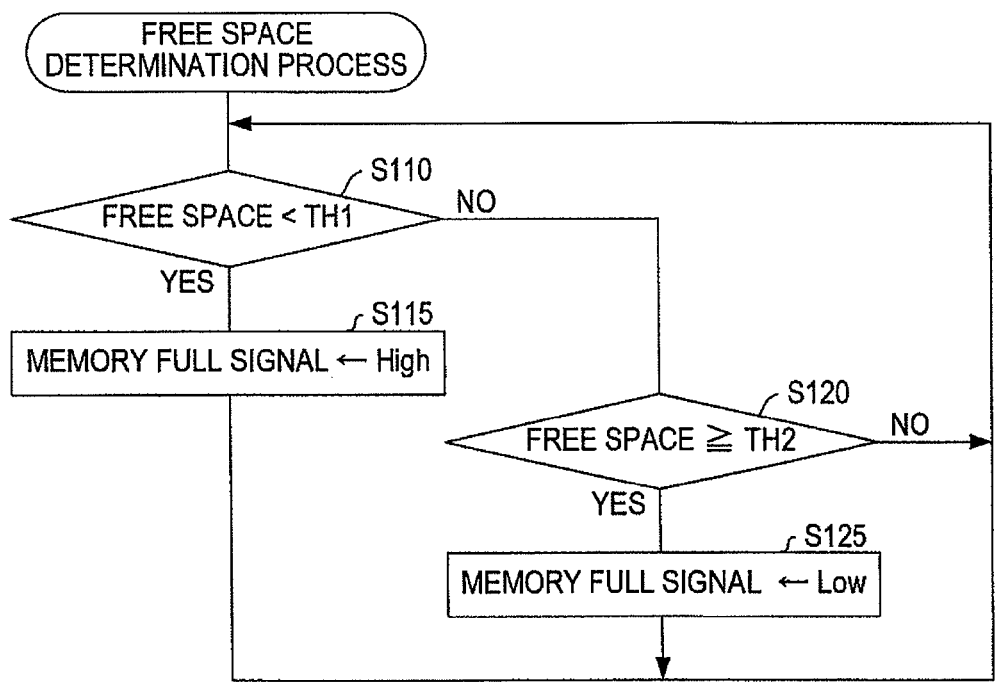
FIG. 4 is a flowchart illustrating a free space determination process in an image data processor.

In order to avoid such situation, the image data processor 53 executes a process as follows. Particularly, the image data processor 53, after started, provides the aforementioned memory full signal to each portion inside the ASIC 40 so as to interrupt or restart the processes inside the ASIC 40 depending on a free space in the buffer 55. The image data processor 53 executes a free space determination process shown in FIG. 4 so as to switch the memory full signal between High-level and Low-level based on the free space in the buffer 55.

When the free space determination process is started, the image data processor 53 determines whether or not the free space in the buffer 55 is smaller than a threshold TH1 (S110). If the free space in the buffer 55 is smaller than the predetermined threshold TH1 (S110: Yes), the memory full signal is switched to High-level (S115). The process moves to S110. If the memory full signal is already High-level, the process moves to S110, keeping the High-level signal. On the other hand, if the free space in the buffer 55 is not smaller than the threshold TH1 (S110: No), it is determined whether or not the free space in the buffer 55 is not smaller than a threshold TH2 (S120). The threshold TH2 is preset to be a larger value than the threshold TH1. These thresholds TH1 and TH2 are stored in a not shown register.

If the free space in the buffer 55 is equal to or larger than the threshold TH2 (S120: Yes), the memory full signal is switched to Low-level (S125). The process moves to S110. If the memory full signal is already Low-level, the process moves to S110, keeping the Low-level signal. If the free space in the buffer 55 is not equal to or larger than the threshold TH2 (S120: No), the process moves to S110 without switching the memory full signal. The image data processor 53 repeatedly executes these steps to switch the memory full signal between High-level and Low-level, until the main controller 65 pauses.

Next, the constitution of the motor controller 60 will be described. The motor controller 60, as shown in FIG. 3, includes an FB signal processor 61, an ADF signal processor 63, the main controller 65, a timer 67, a conveyance time measurer 68 and a reading start instruction signal generator 69.

The FB signal processor 61 includes a position detector 611 that detects a conveyance position X1 in the sub-scanning direction of the line sensor 21 based on pulsed encoder signals (A-phase signal and B-phase signal) provided from the FB encoder 29. Further, the FB signal processor 61 includes a speed detector 612 that detects a conveyance speed V1 of the line sensor 21 based on the encoder signals. The FB signal processor 61 provides to the main controller 65 information on the detected conveyance position X1 and speed V1. The position detector 611 and the speed detector 612 detect the conveyance position X1 and speed V1 of the line sensor 21 in a known technique. For example, the position detector 611, based on the A-phase signal and the B-phase signal of the FB encoder 29, detects a moving direction of the line sensor 21 and updates the conveyance position X1 each time a leading edge of the A-phase signal is detected.

The ADF signal processor 63 includes a position detector 631 that detects a conveyance position X2 of the document based on pulsed encoder signals (A-phase signal and B-phase signal) provided from the ADF encoder 39. Further the ADF signal processor 63 includes a speed detector 632 that detects a conveyance speed V2 of the document. The ADF signal processor 63 provides to the main controller 65 information on the detected conveyance position X2 and speed V2. For example, the position detector 631, based on the A-phase signal and the B-phase signal of the ADF encoder 39, detects a moving direction of the document and updates the conveyance position X2 each time a leading edge of the A-phase signal is detected.

The main controller 65 controls the FB motor 25 based on the information on the conveyance position X1 and speed V1 provided from the FB signal processor 61. The main controller 65 controls the AD motor 35 based on the information on the conveyance position X2 and speed V2 provided from the ADF signal processor 63.

For example, in the case of the ADF reading mode, the main controller 65 executes initial processing of arranging the line sensor 21 below the platen glass 103B (particularly, below the document presser 317). Thereafter, the main controller 65 sets the ADF motor 35 as a target motor to be driven. The main controller 65 then determines a manipulated variable to the ADF motor 35 based on the information on the conveyance position X2 and speed V2 provided from the ADF signal processor 63, and makes the driving circuit 37 drive the ADF motor 35 at a driving current/voltage corresponding to the manipulated variable. In this manner, conveyance control is achieved upon conveying in the sub-scanning direction the document as an object to be conveyed.

In the case of the FB reading mode, the main controller 65 sets the FB motor 25 to the target motor to be driven. The main controller 65 then determines a manipulated variable to the FB motor 25 based on the information on the conveyance position X1 and speed V1 provided from the FB signal processor 61, and makes the driving circuit 27 drive the FB motor 25 at a driving current/voltage corresponding to the manipulated variable. In this manner, conveyance control is achieved upon conveying in the sub-scanning direction the line sensor 21 as an object to be conveyed.

Here, details of the process executed by the main controller 65 will be explained by way of FIGS. 5A and 5B. The main controller 65, when starting a process shown in FIG. 5A, executes initial processing (S210). In the initial processing, the timer 67 is reset. The timer 67 counts elapsed time from start time. Also in the initial processing, the line sensor 21 is placed at an initial position. Particularly, in the ADF reading mode, the line sensor 21 is placed at a document reading position below the platen glass 103B. Also in the ADF reading mode, a separation process of the document from the document tray 113 is performed.

After the initial processing, the main controller 65 stores the current position of the object to be conveyed as a control start position Xst (S213), and further sets acceleration time Ta to a standard acceleration time Ta0 (Ta=Ta0). Then, based on the control start position Xst and the acceleration time Ta, the main controller 65 sets a target position trajectory Xr(T) to be used in S235 (S217). In the present embodiment, the object to be conveyed, after accelerated to a speed Vc, is controlled to be conveyed at a constant speed in S235. Here, a target position trajectory including the acceleration section and a constant speed section is set as the target position trajectory Xr(T) used in this conveyance control. The object to be conveyed herein indicates the line sensor 21 in the case of the FB reading mode, and the document in the case of the ADF reading mode.

The main controller 65 stores a function F1(T) and a function F2(T). The function F1(T) is a basic type of a target position trajectory for the acceleration section. The function F2(T) is a basic type of a target position trajectory for the constant speed section. The main controller 65, by adjusting the acceleration time Ta as a design variable in these functions F1(T) and F2(T), sets the target position trajectory Xt(T) to be used in S235.

$$F1(T)=(\tfrac{1}{2})\cdot(Vc/Ta)\cdot T^2+Xst$$

$$F2(T)=Vc\cdot(T-Ta)+Xst+Da$$

$$Da=(\tfrac{1}{2})\cdot Vc\cdot Ta$$

Figure 5B:
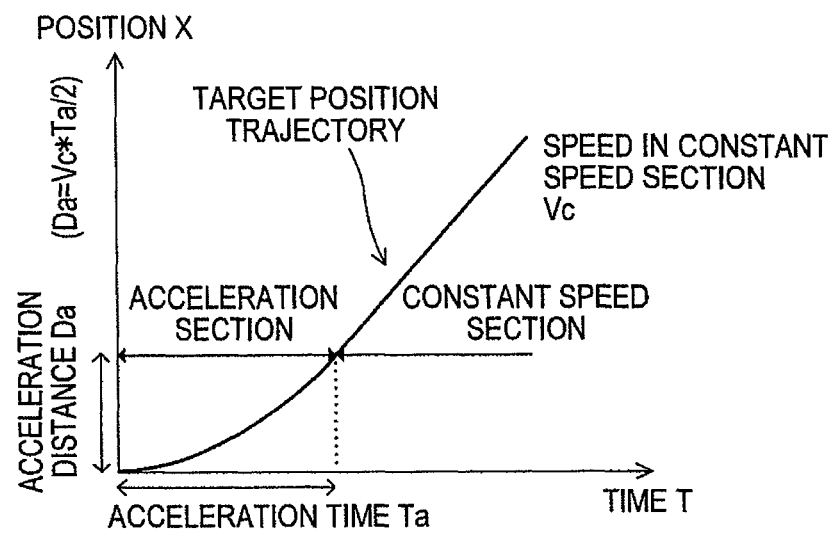
FIG. 5B is a graph showing a target position trajectory.

FIG. 5B shows a target position trajectory corresponding to the above expressions. In the above expressions, the variable T indicates time elapsed from a conveyance control start time. The variable Vc indicates a target speed in the constant speed section. The variable Xst indicates the control start position.

As is understood from the above expressions, the function F1(T), corresponding to the target position trajectory in the acceleration section, indicates a position trajectory in case that the object to be conveyed is conveyed from the control start position Xst at an acceleration A=Vc/Ta. The function F2(T), corresponding to the target position trajectory in the constant speed section, indicates a position trajectory in case that the object to be conveyed is conveyed from the end position of the acceleration section Xa=Xst+Da at the speed Vc. Da indicates a distance, that is, an acceleration distance, required to accelerate the object to be conveyed from a speed zero to the speed Vc at the acceleration A=Vc/Ta. Ta indicates an acceleration time, that is a required time until the speed of the object to be conveyed is shifted from zero to Vc.

In S217, the design variable Ta of the acceleration time in the function F1(T) is set to a standard value of Ta0. Thereby, the target position trajectory Xr(T) in the acceleration section (0≤T<Ta) is set as a standard target position trajectory Xr(T)= $(\tfrac{1}{2})\cdot(Vc/Ta0)\cdot T^2+Xst$. Also, the target position trajectory of Xr(T) in the constant speed section (T≥Ta) following the acceleration section is set as a standard target position trajectory Xr(T)=Vc·(T−Ta0)+Xst+Da0 (where Da0=($\tfrac{1}{2}$)·Vc·Ta0). Among other design variables included in the functions F1(T) and F2(T), the variable Xst is set to the above-described control start position. The speed Vc in the constant speed section is defined by the reading resolution. The speed Vc is prestored per reading resolution in a not shown register together with the standard value of the acceleration time Ta0.

When the step of S217 is ended, the main controller 65 sets a reading start time Trs (S220). In the present embodiment, at the timing when the time indicated by the timer 67 coincides with the reading start time Trs, the reading start instruction signal generator 69 temporarily switches a reading start instruction signal provided to the reading front end 51 from Low-level to High-level, thereby to validate the reading operation of the line sensor 21. In S220, the timing when the reading start instruction signal is switched to High-level as above is set as the reading start time Trs. Particularly, the main controller 65, based on the target position trajectory from the control start position Xst set in S217 and a reading area of the document, calculates time to be set as the reading start time Trs. The time obtained by the calculation is set to the reading start instruction signal generator 69.

When the present step is ended, the main controller 65, upon output of the line start signal by the line start signal generator 511 (S225: Yes), resets the timer 67, and further starts the timer 67 to count time from zero (S230). With this operation, the main controller 65 makes the timer 67 measure the time T elapsed from the conveyance control start time. At the same time, the main controller 65 starts control of the motor to be driven based on the above-noted target position trajectory and the conveyance position X of the object to be conveyed detected by the FB signal processor 61 or the ADF signal processor 63 (S235).

Particularly, in S235, a constant speed conveyance control process is started at the same time with the output of line start signal by the line start signal generator 511. In the constant speed conveyance control process, drive control of the motor to be driven based on the target position trajectory is started at the same time with the output of the line start signal. In the constant speed conveyance control process, the object to be conveyed is accelerated from the control start position Xst to the predetermined speed Vc according to a position trajectory corresponding to the above-noted target position trajectory by the line sensor conveyance mechanism 23 or the document conveyance mechanism 31. Thereafter, drive control of the object to be driven is performed so that the object to be conveyed is conveyed at a constant speed. The motor to be driven herein is the FB motor 25 in the case of the FB reading mode, and the ADF motor 35 in the case of the ADF reading mode. Also, the conveyance position X of the object to be conveyed is, in case that the reading mode is the FB reading mode, the conveyance position X1 provided from the FB signal processor 61. In case that the reading mode is the ADF reading mode, the conveyance position X of the object to be conveyed is the conveyance position X2 provided from the ADF signal processor 63.

Upon the drive control of the motor to be driven, a manipulated variable U is calculated such that an error E=X−Xr, between the target position Xr(T) at a current time T and the current conveyance position X of the object to be conveyed detected by the FB signal processor 61 or the ADF signal processor 63, comes close to zero. The calculated manipulated variable U is set to the driving circuit (i.e., the driving circuit 27 or the driving circuit 37) corresponding to the motor to be driven. Thereby, the motor to be driven is driven by the corresponding driving circuit at a driving current/voltage corresponding to the manipulated variable U. The control system may be a combination of a position feedback system and a speed feedback system. In other words, the manipulated variable U can be calculated based on the current conveyance position X and speed V of the object to be conveyed detected by the FB signal processor 61 or the ADF processor 63.

After starting the constant speed conveyance control process, it is determined, while the constant speed conveyance control process is continued, whether or not the memory full signal sequentially provided from the reading controller 50 (image data processor 53) has switched from Low-level to High-level (S240). It is further determined whether or not reading operation for the overall reading area has been complete (S245).

When the reading operation for the overall reading area has been complete (S245: Yes), a predetermined end process is executed (S290). Particularly, when the reading mode is the FB reading mode, the line sensor 21 is decelerated and stopped by motor control, and the stopped line sensor 21 is conveyed to its home position, as the end process. When the reading mode is the ADF reading mode, a process of discharging the document is executed as the end process. Thereafter, the main controller 65 pauses.

Figure 6:
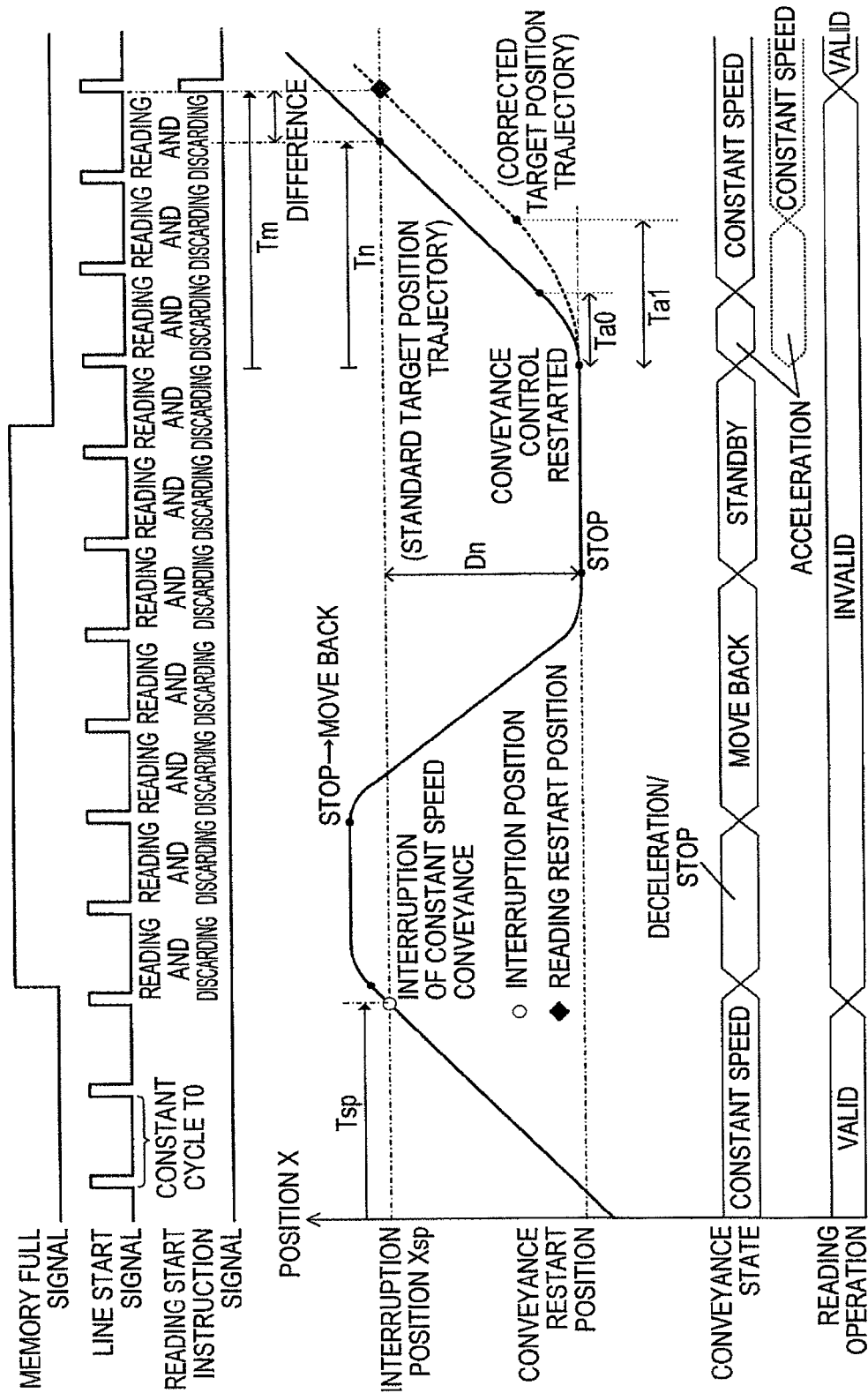
FIG. 6 is a time chart showing conveyance modes and reading modes.

When it is determined, as shown in FIG. 6, that the memory full signal is switched from Low-level to High-level (S240: Yes), the main controller 65 interrupts the constant speed conveyance control process and executes a constant speed conveyance interruption process that decelerates and stops the object to be conveyed by motor control (S250). In the constant speed conveyance interruption process, based on the target position trajectory upon deceleration and the conveyance position X and speed V of the object to be conveyed detected by the FB signal processor 61 or the ADF signal processor 63, the object to be conveyed is smoothly decelerated and stopped according to the predetermined target position trajectory upon deceleration.

When this process is ended, the main controller 65 controls the motor to be driven based on the target position trajectory upon moving back and the conveyance position X and speed V of the object to be conveyed detected by the FB signal processor 61 or the ADF signal processor 63. Thereby, the main controller 65 places the object to be conveyed at a position moved back from the stopped position of the object to be conveyed by the step of S250 to an upstream in a conveyance direction of the object to be conveyed by a predetermined distance Db (S260).

Particularly, the move-back distance Db of the object to be conveyed can be defined as an amount obtained by adding, to a deceleration distance Dd, the acceleration distance Da0 of the standard target position trajectory and a predetermined redundant quantity a (Dd+Da0+α). The deceleration distance Dd is a moving distance of the object to be conveyed from when the object to be conveyed is decelerated by the step of S250 to when the object to be conveyed is stopped.

The redundant quantity α is provided to allow restart of valid reading operation by the line sensor 21 at a constant speed, from the position Xsp where the object to be conveyed was present upon input of the line start signal immediately before the memory full signal is switched to High-level. In the present embodiment, in order to provide the line start signal to the line sensor 21 at the position Xsp, the acceleration time Ta is changed from the standard acceleration time Ta0 to a large value when the target position trajectory is set upon restart of conveyance. Thus, in the target position trajectory upon restart of conveyance, the acceleration distance until when the object to be conveyed is switched to a constant speed state is extended from the acceleration distance Da0 of the standard target position trajectory. On the other hand, the object to be conveyed is required to be switched into a constant speed state of the speed Vc at the position Xsp.

Because of the above reasons, the redundant quantity α is used. In other words, the redundant quantity α is defined as a value which guarantees, with sufficient probability, that the object to be conveyed is in a constant speed state of the speed Vc at the above position. Particularly, in consideration of an estimated maximum value Tx of the acceleration time Ta, the redundant quantity α is defined so that the object to be conveyed is moved back to the conveyance restart position which moves back by a distance equal to or larger than the acceleration distance Dx=(½)·Vc·Tx which corresponds to the acceleration time Tx from the restart position of valid reading operation by the line sensor 21.

Due to an event that the memory full signal is switched from Low-level to High-level, a value of the timer 67 (time T) at the time (hereinafter, referred to as an "interrupted time" as well) when the line start signal is provided to the line sensor 21 for the last time before the memory full signal is switched from Low-level to High-level, is stored in the conveyance time measurer 68 as the conveyance time Tsp. Here, by way of FIG. 7A, details of the conveyance time measurer 68 will be explained.

Figure 7A:
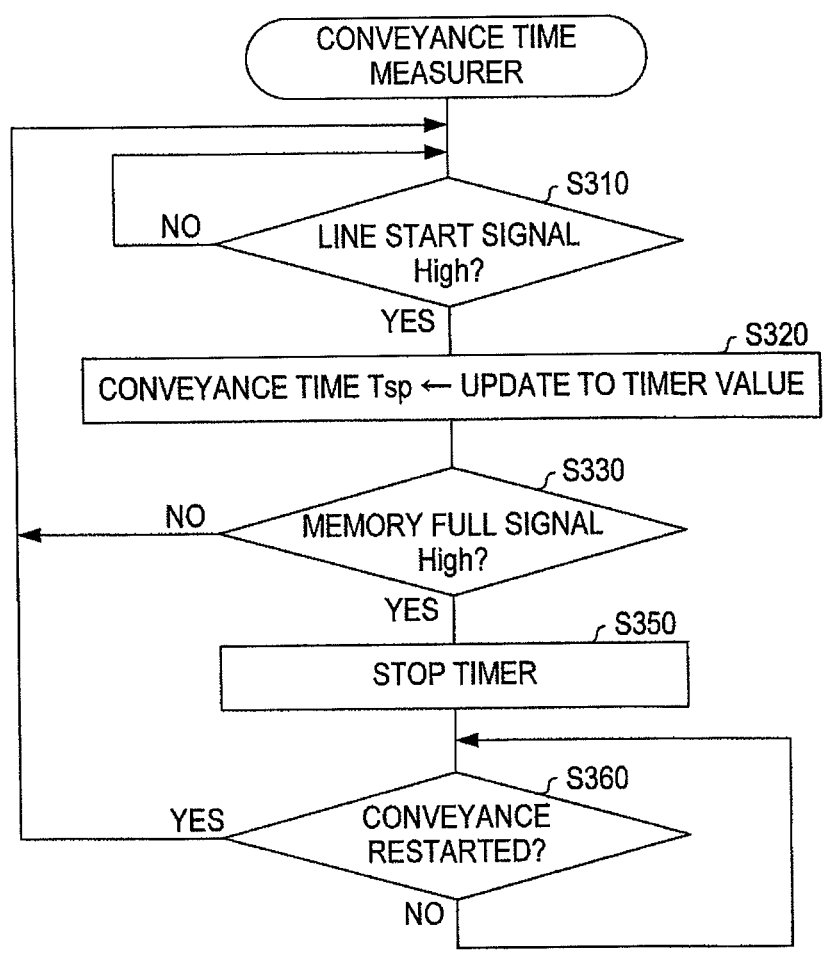
FIG. 7A is a flowchart illustrating a process executed by a conveyance time measurer.

The conveyance time measurer 68, when started, executes a process shown in FIG. 7A. As shown in FIG. 7A, the conveyance time measurer 68, each time a leading edge of the line start signal provided from the line start signal generator 511 is detected (S310: Yes), updates the conveyance time Tsp to the current time T indicated by the timer 67 at that time (i.e., elapsed time from the conveyance control start time) (S320).

When the memory full signal is switched from Low-level to High-level (S330: Yes), the timer 67 is stopped (S350).

Thereafter, the conveyance time measurer 68 stands by until the memory full signal is switched from High-level to Low-level and the conveyance control from the conveyance restart position of the object to be conveyed is started (S360). When the memory full signal is switched from High-level to Low-level and the conveyance control from the conveyance restart position is started (S360: Yes), the process moves to S310. The subsequent process is executed.

The conveyance time measurer 68 executes the above-noted process until the main controller 65 pauses. With this operation, the conveyance time measurer 68 stores as the conveyance time Tsp the value of the timer 67 (time T) at the interrupted time (see FIG. 6).

Turning back to the process of the main controller 65, the main controller 65, when the step of S260 is ended, stands by until the memory full signal is switched from High-level to Low-level (S270). When the memory full signal is switched from High-level to Low-level, an interrupted position Xsp which is the conveyance position of the object to be conveyed at the interrupted time is estimated according to the following expression based on the conveyance time Tsp held by the conveyance time measurer 68 at this point and the control start position Xst stored in advance.

$$Xsp = Xst + Da + (Tsp - Ta) \cdot Vc$$

As previously explained, Da indicates a conveyance distance (acceleration distance) in the acceleration section in the target position trajectory used in S235. Ta indicates a time length (acceleration time) in the acceleration section, and Vc indicates the target speed of the object to be conveyed in the constant speed section. In this manner, in the present embodiment, the target position Xr (Tsp) at the time when the conveyance time Tsp has elapsed from the conveyance control start time is estimated as the interrupted position Xsp (S275).

When this step is ended, the process moves to S280. The main controller 65 executes a target position trajectory correction process shown in FIG. 8. When the target position trajectory correction process shown in FIG. 8 is started, the main controller 65 updates the control start position Xst to the conveyance restart position which is the current position of the object to be conveyed (S281), and calculates a distance Dn from the updated control start position Xst to the interrupted position Xsp (S282).

$$Dn = Xsp - Xst$$

Then, a time Tn is calculated which is time for the object to be conveyed to reach the interrupted position Xsp, in case that conveyance control is executed based on the standard target position trajectory from the updated control start position Xst and has the acceleration time Ta=Ta0 (S283).

$$Tn = (Dn - Da0)/Vc + Ta0$$

$$Da0 = (½) \cdot Vc \cdot Ta0$$

After calculation of the time Tn, time Tm is calculated, which is a time later than the time Tn and at which a time length from time zero is an integral multiple of the line cycle T0 (S284).

$$Tm = \{INT(Tn/T0) + k\} \cdot T0$$

Here, INT(Tn/T0) is a value obtained by dividing Tn by T0 and truncated to decimal places, i.e., an integral part of the value obtained by dividing Tn by T0. Any integers equal to or larger than one can be set to the variable k. However, for the reason later described, it is preferable to set one to k (k=1) since process time required for a series of reading is increased if the value k is increased.

Further, acceleration time Ta1 is calculated with which the interrupted position Xsp is reached at the time Tm (S285).

$$Ta1 = 2 \cdot (Tm - ((Xsp - Xst)/Vc))$$

The above relational expression can be obtained by organizing the following expression.

$$Xsp - Xst = (½) \cdot (Vc/Ta1) \cdot Ta1^2 + Vc(Tm - Ta1)$$

Then, the above calculated acceleration time Ta1 is set as the acceleration time Ta, thereby setting the target position trajectory Xr(T) to be used in the step of S235 (S286). Particularly, the target position trajectory Xr(T) in the acceleration section ($0 \leq T < Ta = Ta1$) is set as follows: $Xr(T) = (½) \cdot (Vc/Ta1) \cdot T^2 + Xst$. Further, the target position trajectory Xr(T) in the constant speed section ($T \geq Ta = Ta1$) following the acceleration section is set as follows: $Xr(T) = Vc \cdot (T - Ta1) + Xst + Da1$ (where $Da1 = (½) \cdot Vc \cdot Ta1$).

When this process is ended, the process moves to S289. The main controller 65 sets the time Tm as the reading start time Trs to the reading start instruction signal generator 69. Thereafter, the target position trajectory correction process is ended. When the target position trajectory correction process is ended as such, the process moves to S225. The main controller 65 resets and further starts the timer 67 in accordance with output timing of the line start signal. At the same time, the main controller 65 starts the constant speed conveyance control process from the control start position Xst (conveyance restart position) based on the target position trajectory set in S280 (S235).

In the above, process operation of the main controller 65 has been described. When the main controller 65 starts the step of S235 via the step of S280, the object to be conveyed arrives at the interrupted position Xsp at the output timing of the line start signal provided to the line sensor 21 (see the corrected target position trajectory shown in a dotted line in FIG. 6). Also, the reading start instruction signal provided from the reading start instruction signal generator 69 to the reading front end 51 is temporarily switched from Low-level to High-level, at the time Trs when the object to be conveyed arrives at the interrupted position Xsp.

Figure 7B:
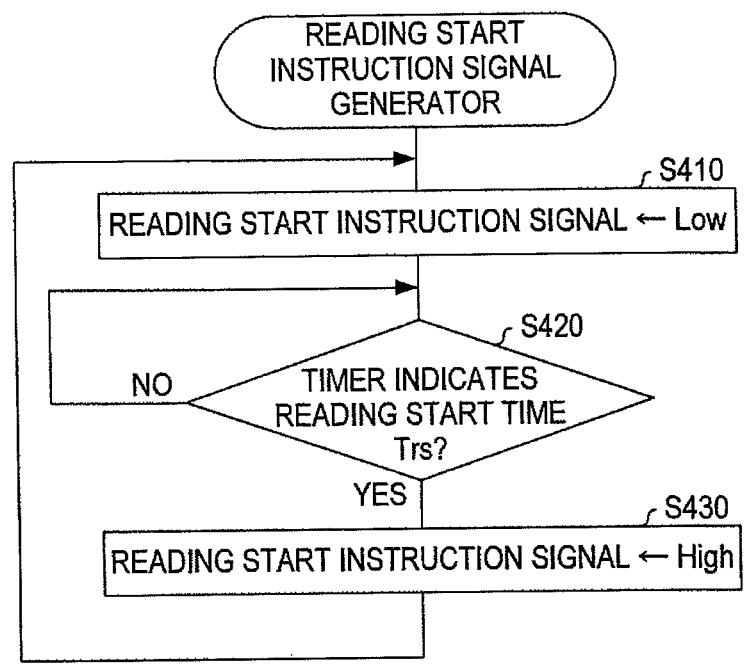
FIG. 7B is a flowchart illustrating a process executed by a reading start instruction signal generator.

The reading start instruction signal generator 69, when started, sets the reading start instruction signal to be provided to the reading front end 51 to Low-level, as shown in FIG. 7B (S410). In this state, the reading start instruction signal generator 69 stands by until the value of the timer 67 coincides with the reading start time Trs preset by the main controller 65 (S420: No). When the value of the timer 67 coincides with the reading start time Trs (S420: Yes), the reading start instruction signal is switched from Low-level to High-level (S430). Thereafter, the process returns to S410. The reading start instruction signal is switched to Low-level again. The reading start instruction signal generator 69 executes this process repeatedly.

Accordingly, after the constant speed conveyance control process is restarted, a High-level signal is outputted from the reading start instruction signal generator 69 to the reading front end 51 as the reading start instruction signal at the time when the object to be conveyed has reached the interrupted position Xsp, as shown in FIG. 6. Moreover, the line start signal is provided from the line start signal generator 511 to the line sensor 21. As a result, from this point, valid reading operation by the line sensor 21 is restarted. Thus, according to the image reading apparatus 1 of the present embodiment, valid reading operation can be executed accurately from the position Xsp corresponding to the line where the reading operation is invalidated because the memory full signal is switched to High-level. The line image data generated by the reading operation is combined with the line image data generated before then so that the read image data of the document can be generated with high image quality.

According to the image reading apparatus 1 of the present embodiment, without configuring an image reading apparatus such that a line start signal is synchronous with an encoder signal as before, image degradation of the read image data before and after the interruption (i.e., before and after switching between valid/invalid reading operation) can be inhibited. The read image data of the document can be generated with high image quality.

In addition, according to the present embodiment, the interrupted position is specified based on the target position trajectory Xr(T) and not based on the position detected by the FB signal processor 61 or the ADF signal processor 63 which detects the position based on the encoder signal. Thus, the interrupted position can be specified with high precision. In the case where the encoder signal and the line start signal are not synchronous with each other, and if the interrupted position is specified from the position detected by the FB signal processor 61 or the ADF signal processor 63, an error is generated in specifying the interrupted position due to a position resolution of the encoder signal. On the other hand, in the present embodiment, an influence of such position resolution of the encoder signal can be blocked. The interrupted position can be specified with high precision.

Also, according to the present embodiment, upon restart of the constant speed conveyance control process, the target position trajectory Xr(T) in the acceleration section and the constant speed section is corrected so that the object to be conveyed reaches the interrupted position Xsp at the output timing of the line start signal. Thus, it is not necessary to provide in the line start signal generator 511 a function of forcibly making the line start signal generator 511 output the line start signal at the interrupted position Xsp.

Moreover, according to the present embodiment, without making the line start signal synchronous with the encoder signal, valid reading operation can be restarted from the interrupted position. With a simple device configuration, valid reading operation can be restarted from the interrupted position with high precision.

<Variation>

Now, a variation of the above-described embodiment will be described hereinafter. The image reading apparatus 1 in the variation is only different from the image reading apparatus 1 in the above-described embodiment in process steps executed by the main controller 65. Thus, the process steps executed by the main controller 65 will be selectively described hereafter by way of FIGS. 9A, 9B and 10. The same step numbers will be given to the steps identical to those in the above-described embodiment, and the description thereof will be simplified or omitted.

Figure 9A:
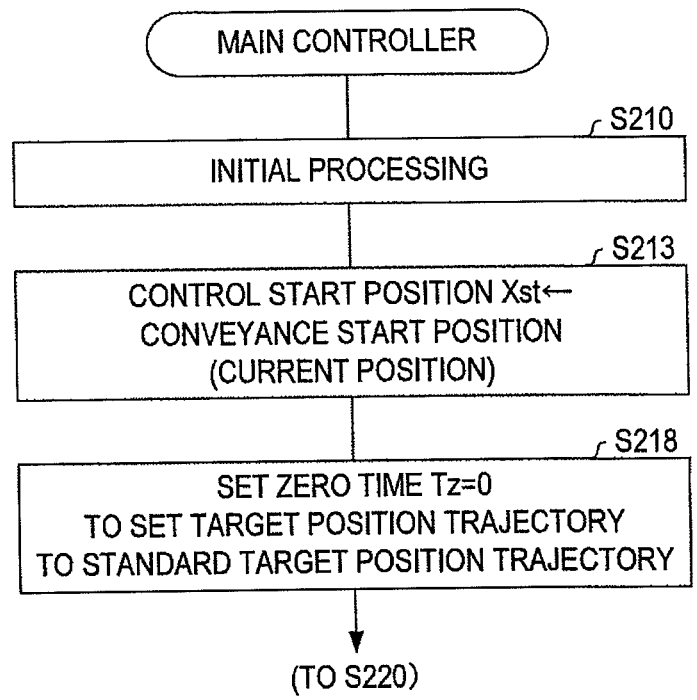
FIG. 9A is a flowchart illustrating a process executed by the main controller according to a variation.

The main controller 65 in the variation, when started, executes the process shown in FIG. 9A. Similar to the above-described embodiment, after executing the initial processing (S210), the main controller 65 stores the current position of the object to be conveyed as the control start position Xst (S213). Also, the main controller 65 sets zero time Tx=0 so as to set the target position trajectory Xr(T) to be used in S235 (S218). Details of the zero time Tx will be provided later. The target position trajectory Xr(T) having the zero time Tz=0 is the same as the standard target position trajectory having the acceleration time Ta=Ta0 in the above-described embodiment. After execution of S218, the process moves to S220.

The main controller 65 executes the following steps (S220 to S290) in the same manner as in the above-described embodiment.

Figure 9B:
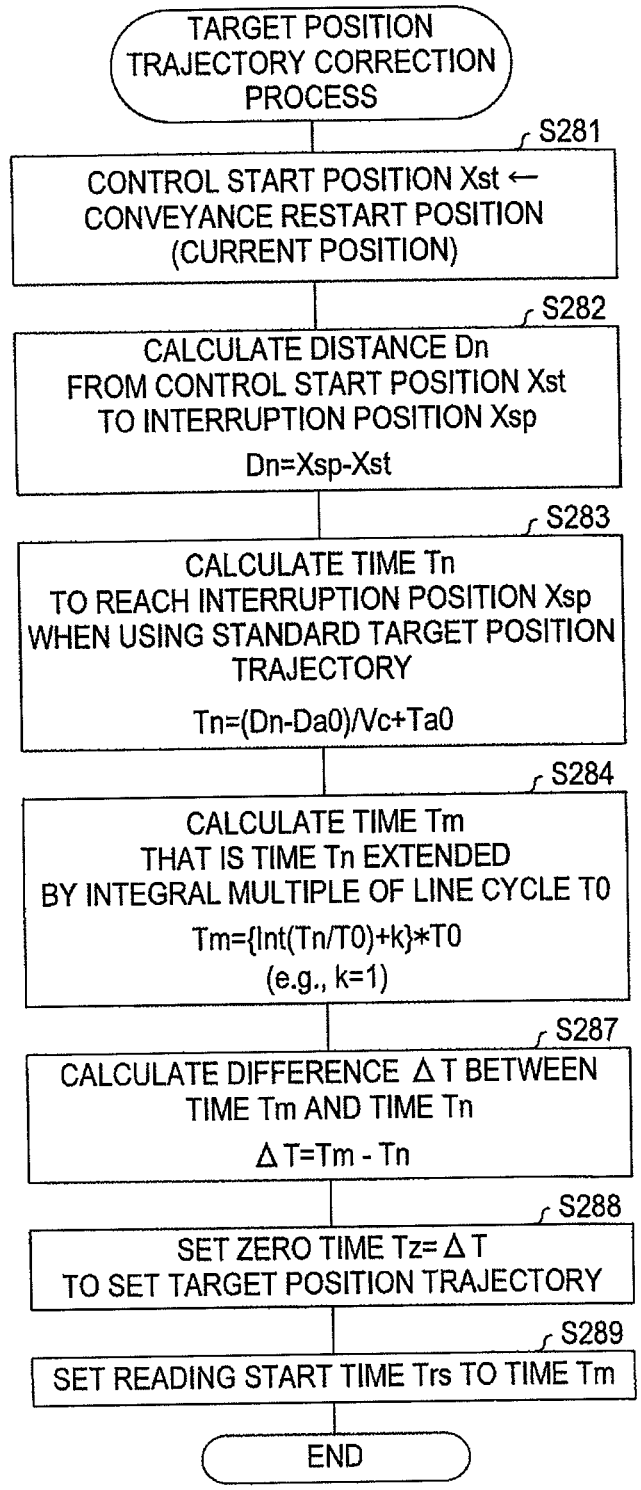
FIG. 9B is a flowchart illustrating the target position trajectory correction process executed by the main controller according to the variation.

In S280, a target position trajectory correction process shown in FIG. 9B is executed, in place of the target position trajectory correction process shown in FIG. 8. When the target position trajectory correction process shown in FIG. 9B is executed, the main controller 65 updates the control start position Xst to the conveyance restart position that is the current position of the object to be conveyed (S281).

Thereafter, the main controller 65 calculates the time Tn when the object to be conveyed reaches the interrupted position Xsp, in case that conveyance control is executed based on the standard target position trajectory (S282 and S283).

Moreover, the main controller 65 calculates the time Tm which is a time later than the time Tn and at which a time length from time zero is an integral multiple of the line cycle T0 (S284). Thereafter, a difference (ΔT=Tm−Tn) between the time Tm and the time Tn is calculated (S287).

When the above process is complete, the main controller 65 sets zero time Tz=ΔT, thereby to set the target position trajectory Xr(T) to be used in the step of S235 (S288). In the variation, the target position trajectory Xr(T) is defined as follows.

Section $0 \leq T < Tz$ (1)

$Xr(T) = Xst$

Section $Tz \leq T < (Ta0 + Tz)$ (2)

$Xr(T) = (\tfrac{1}{2}) \cdot (Vc/Ta0) \cdot (T-Tz)^2 + Xst$

Section $T \geq Ta0 + Tz$ (3)

Figure 10:
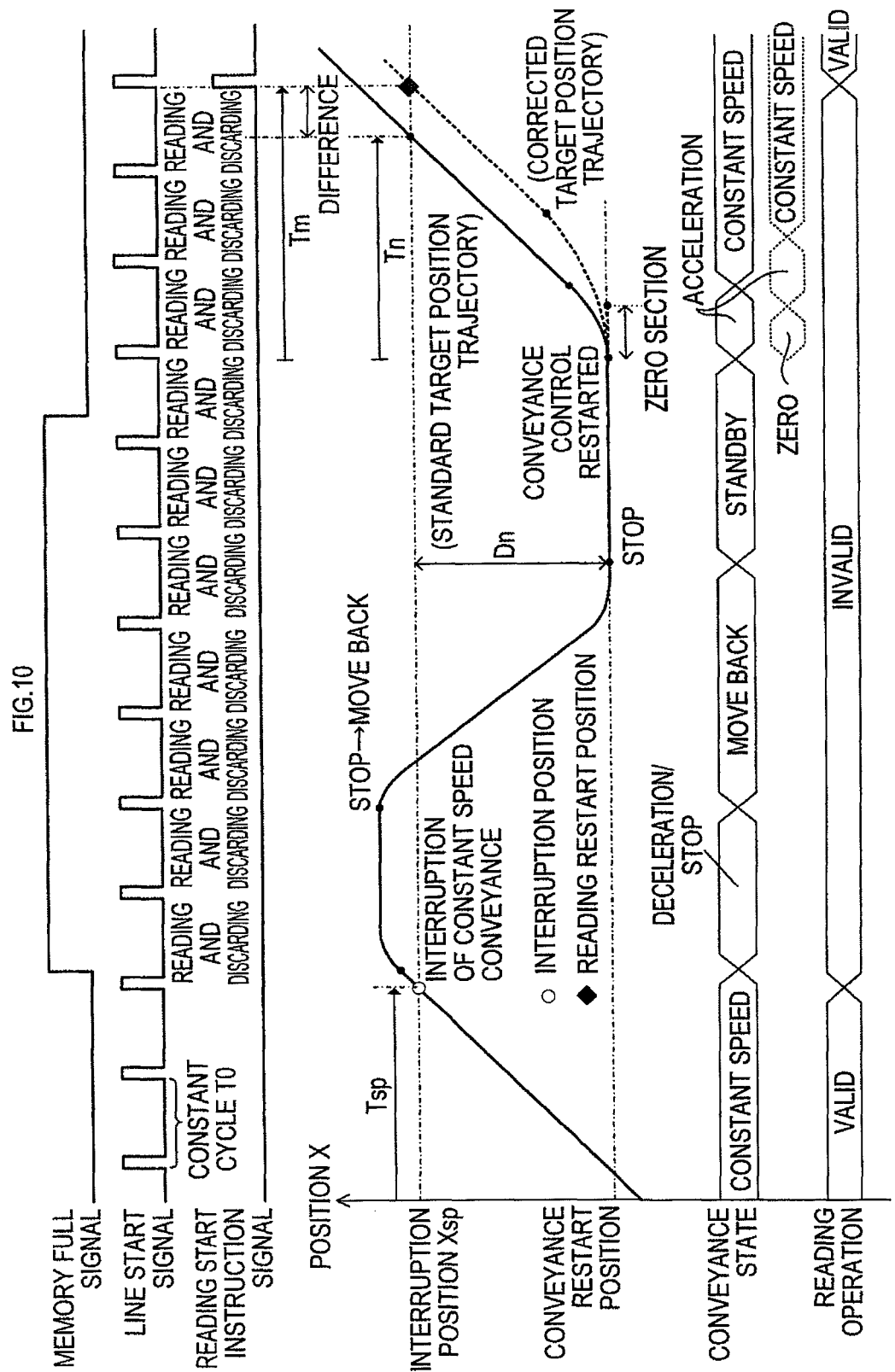
FIG. 10 is time chart showing conveyance modes and reading modes according to the variation.

$Xr(T) = Vc \cdot (T - (Ta0 + Tz)) + Xst + Da0$ $Da0 = (\tfrac{1}{2}) \cdot Vc \cdot Ta0$ Accordingly, the target position trajectory Xr(T) having Tz=0 coincides with the standard target position trajectory having the acceleration time Ta=Ta0 in the above-described embodiment. Also, if the zero time Tz=ΔT is set in S288, a target position trajectory added with a zero section having a time length of Tz=ΔT to the head of the standard position trajectory is to be set as shown in FIG. 10. The zero section is a section having a zero speed and a zero acceleration.

Particularly, the target position trajectory is set such that conveyance time in a conveyance process including the zero section from the control start position Xst (conveyance restart position) to the interrupted position Xsp is an integral multiple of the output cycle of the line start signal. When the step of S288 is complete as such, the process moves to S289. The main controller 65 sets the time Tm to the reading start instruction signal generator 69 as the reading start time Trs. Thereafter, the target position trajectory correction process is ended. The process moves to S225.

The variation has been described in the above. According to the variation, the target position trajectory in which the conveyance time from the conveyance restart position to the interrupted position Xsp is an integral multiple of the output cycle of the line start signal can be set by the simple process steps.

<Description on Correspondence Relation>

The embodiment of the present invention has been described in the above. Now, correspondence relations between the terms will be described. The line start signal generator 511 corresponds to an example of the signal output unit. The line sensor 21 corresponds to an example of the reading unit. The line sensor conveyance mechanism 23 or the document conveyance mechanism 31 corresponds to an example of the conveyance unit. The position detector 611 or the position detector 631 corresponds to an example of the position detecting unit.

The steps of S225, S235, S250 and S260 executed by the main controller 65 correspond to an example of the process implemented by the controller. The steps of S217 (S218 in the variation) and S286 (S288 in the variation) correspond to an example of the process implemented by the target setting unit. The process operation by the timer 67 and the conveyance time measurer 68 and the step of S275 executed by the main controller 65 correspond to an example of the process implemented by the position specifying unit. Operation of the output controller 515, setting operation of the reading start time Trs (S289), and operation of the reading start instruction signal generator 69 correspond to an example of the process implemented by the mode switching unit.

The time when the line start signal is provided to the line sensor 21 from the line start signal generator 511 for the last time before when the memory full signal is switched from Low-level to High-level (time corresponding to the conveyance time Tsp illustrated in FIG. 6 or 10) corresponds to an example of the time Tf when the line start signal which defines the timing to start the first reading operation invalidated by the mode switching unit is outputted.

The steps of S240 and S270 correspond to an example of the process implemented by the condition determining unit. Operation of the image data processor 53 which outputs the line image data to the RAM 15 and generates the read image data corresponds to an example of the process implemented by the image data generating unit. The analog shift register 213 corresponds to an example of the holding circuit.

The present invention is not limited to the above-described embodiments (including the variation) and can take various forms.

For example, in the above-described embodiments, the acceleration time Ta is adjusted to set the target position trajectory such that the conveyance time from the conveyance restart position to the interrupted position Xsp is an integral multiple of the output cycle of the line start signal. Adjustment of the target position trajectory may be achieved by adjusting the acceleration distance Da instead of the acceleration time Ta. There is a relation expressed as $Da=(\frac{1}{2}) \cdot Vc \cdot Ta$ between the acceleration time Ta and the acceleration distance Da. Accordingly, an equivalent process can be achieved.

Also in S284, the time Tm, which is later than the time Tn, is calculated at which the time length from time zero is an integral multiple of the line cycle T0. In the embodiment adjusting the acceleration time Ta, the time Tm, which is earlier than the time Tn, may be calculated at which the time length from time zero is an integral multiple of the line cycle T0. In other words, the value k in the expression $Tm=\{INT(Tn/T0)+k\}+T0$ may be set as an integer equal to or smaller than zero. In this case, it is necessary for the acceleration time Ta0 in the standard target position trajectory to be set sufficient enough for motor performance. However, the same effect can be achieved in this manner as well.

In the above-described embodiments, when the High-level signal is provided as the memory full signal, the function to transfer the line image data to the image data processor 53 is stopped, and the line image data to be provided from the line sensor 21 is destroyed in the output controller 515. Thereby, the reading operation by the line sensor 21 is invalidated.

The reading operation by the line sensor 21 may be invalidated by not providing a transfer clock signal to the line sensor 21 from the transfer clock signal generator 513. In this case, until the line start signal is first provided to the line sensor 21 when and after the High-level signal was provided as the memory full signal, the transfer clock signal is provided to the line sensor 21. With this operation, information on the signal charge (line image data) transferred to the analog shift register 213 by the line start signal provided to the line sensor 21 for the last time before the High-level signal was provided as the memory full signal, is obtained from the line sensor 21. The obtained line image data are regarded as valid. Thereafter, input of the transfer clock signal to the line sensor 21 is stopped.

After restart of the conveyance, the input of the transfer clock signal to the line sensor 21 is restarted from when the object to be conveyed has reached the interrupted position Xsp. However, the information on the signal charge accumulated in the analog shift register 213 until when the object to be conveyed reaches the interrupted position Xsp has to be destroyed, since this information of the signal charge is based on invalid reading operation. Accordingly, in this example as well, the output controller 515 destroys the line image data outputted from the line sensor 21 according to the transfer clock signal, during a period from a time TW1 until a time TW2. The time TW1 is when the line start signal is provided to the line sensor 21 once the object to be conveyed has reached the interrupted position Xsp after the restart of the conveyance. The time TW2 is when the next line start signal is provided to the line sensor 21.

In the above-described embodiments, even during a period when the reading operation is invalidated, the line start signal is periodically provided to the line sensor 21. During this period, however, transmission of the line start signal outputted from the line start signal generator 511 to the line sensor 21 may be interrupted. For example, a relay circuit may be provided on a transmission path of the line start signal, which connects the line start signal generator 511 to the line sensor 21. By controlling the relay circuit, the transmission can be interrupted.

Even if the transmission of the line start signal to the line sensor 21 is interrupted, accumulation operation of the signal charge by the photoelectric effect is carried out in the line sensor 21. Accordingly, in this case as well, the output controller 515 has to destroy the line image data outputted from the line sensor 21 according to the transfer clock signal, during a period from the time TW1 until the time TW2.

In the above-described embodiments, the target position trajectory is set by a function which provides a target position at each continuous time. The target position trajectory may be set to be in the form of time-series data which indicates the target position at each discrete time.

What is claimed is:

1. An image reading apparatus comprising:
    a signal output unit that periodically outputs a line start signal which defines a timing to start a reading operation;
    a reading unit that executes an operation, as the reading operation, of reading a document to be read in a main scanning direction, each time the line start signal is provided from the signal output unit, and generates line image data per line which indicates a read image of the line;
    a conveyance unit that has a motor, and conveys one of the reading unit and the document, as an object to be conveyed, in a sub-scanning direction with a driving force generated by the motor;
    a position detecting unit that detects a conveyance position of the object;

a controller that controls the motor based on the conveyance position of the object detected by the position detecting unit and a predetermined first target position trajectory, thereby to accelerate the object to follow a position trajectory corresponding to the first target position trajectory from a conveyance start position up to a predetermined speed, and after the acceleration, convey the object at a constant speed;

a target setting unit that sets to the controller a target position trajectory which starts from the conveyance start position, as the first target position trajectory;

a mode switching unit that invalidates the reading operation by the reading unit when a predetermined interruption condition is satisfied; and a position specifying unit that specifies, as an interrupted position, the conveyance position of the object at a time Tf when the line start signal which defines the timing to start the first reading operation invalidated by the mode switching unit, among the line start signals outputted from the signal output unit, is outputted, wherein the controller interrupts the constant speed conveyance of the object when the interruption condition is satisfied, and controls the motor to stop the object, and, after the object is stopped, controls the motor based on the conveyance position of the object detected by the position detecting unit, thereby to dispose the object at a conveyance restart position moved back from the interrupted position, wherein the target setting unit is configured, when the interruption condition is satisfied, to set a target position trajectory which starts from the conveyance restart position to the controller as a second target position trajectory, and in that case adjusts a position trajectory of an acceleration section included in the second target position trajectory, thereby to set to the controller the second target position trajectory adjusted such that a conveyance time from the conveyance restart position to the interrupted position is an integral multiple of an output cycle of the line start signal, wherein the controller, when a predetermined restart condition is satisfied, starts control of the motor based on the second target position trajectory at a timing which coincides with a timing when the line start signal is outputted from the signal output unit, thereby to control the conveyance unit to accelerate the object from the conveyance restart position up to the predetermined speed to follow a position trajectory corresponding to the second target position trajectory, and after the acceleration to convey the object at the constant speed, wherein the mode switching unit, when the restart condition is satisfied, validates the reading operation executed by the reading unit based on and after the line start signal provided to the reading unit at a timing when the object reaches the interrupted position.

2. The image reading apparatus according to claim 1, wherein the mode switching unit invalidates the reading operation by destroying the line image data generated by the reading operation, and validates the reading operation by stopping destroying the line image data.

3. The image reading apparatus according to claim 1, further comprising
an image data generating unit that combines the line image data generated by the reading unit to generate a series of image data corresponding to the document,
wherein the image data generating unit combines the line image data, excluding the line image data generated by invalid reading operation from the line image data generated by the reading unit, to generate the series of image data.

4. The image reading apparatus according to claim 1, further comprising
an image data generating unit that combines the line image data generated by the reading unit to generate a series of image data corresponding to the document,
wherein the mode switching unit has a function to transfer the line image data generated by the reading unit to the image data generating unit, and invalidates the reading operation by stopping the transfer function and validates the reading operation by restarting the transfer function.

5. The image reading apparatus according to claim 1,
wherein the target setting unit adjusts an acceleration time or an acceleration distance until the object is accelerated to be switched to a constant speed state, thereby to adjust the second target position trajectory such that the conveyance time from the conveyance restart position to the interrupted position is an integral multiple of the output cycle of the line start signal.

6. The image reading apparatus according to claim 1,
wherein the position trajectory of the acceleration section included in the second target position trajectory is defined by a predetermined function, and
wherein the target setting unit adjusts a design variable of the predetermined function, thereby to adjust the second target position trajectory such that the conveyance time from the conveyance restart position to the interrupted position is an integral multiple of the output cycle of the line start signal.

7. The image reading apparatus according to claim 1,
wherein the second target position trajectory is a position trajectory added with a zero section, which has a zero speed and a zero acceleration, to a head of a position trajectory which starts from the conveyance restart position and has a form identical with the first target position trajectory, and
wherein the target setting unit adjusts a time length of the zero section, thereby to adjust the second target position trajectory such that the conveyance time from the conveyance restart position to the interrupted position is an integral multiple of the output cycle of the line start signal.

8. The image reading apparatus according to claim 7,
wherein the target setting unit determines the time length of the zero section, by comparison between a conveyance time Tn from the conveyance restart position to the interrupted position defined by the second target position trajectory in the case of no zero section, and an output cycle T0 of the line start signal by the signal output unit.

9. The image reading apparatus according to claim 1,
wherein the position specifying unit specifies the interrupted position based on the first target position trajectory.

10. The image reading apparatus according to claim 9,
wherein the position specifying unit specifies as the interrupted position a target position at the time Tf indicated by the first target position trajectory.

11. The image reading apparatus according to claim 1,
wherein the first target position trajectory and the second target position trajectory are constituted as time-series data or a function indicating a target position at each discrete or continuous time elapsed from a time when the control of the motor is started.

12. The image reading apparatus according to claim 11,
wherein the position specifying unit detects an elapsed time at the time Tf, the elapsed time being a time elapsed from when the control of the motor is started based on the first target position trajectory, and the position specifying unit specifies as the interrupted position the target position at the detected time indicated by the first target position trajectory.

13. The image reading apparatus according to claim 1,
wherein the mode switching unit specifies, based on the second target position trajectory, a time required for the object to reach the interrupted position from when the control of the motor is started based on the second target position trajectory, and validates the reading operation executed by the reading unit at a time when the time required has passed from the time when the control of the motor is started based on the second target position trajectory.

14. The image reading apparatus according to claim 1,
wherein the position detecting unit detects the conveyance position of the object based on an encoder signal provided from an encoder that outputs the encoder signal in accordance with a move of the object.

15. The image reading apparatus according to claim 1, further comprising
a condition determining unit that determines whether or not the interruption condition and the restart condition are satisfied, respectively, based on a free space of a buffer that stores the line image data generated by the reading operation.

16. The image reading apparatus according to claim 15,
wherein the condition determining unit determines that the interruption condition is satisfied when the free space of the buffer is smaller than a first threshold, and determines that the restart condition is satisfied when the free space of the buffer is equal to or larger than a second threshold which is defined to be in a numerical range which is equal to or larger than the first threshold.

17. The image reading apparatus according to claim 15,
wherein the reading unit is a line sensor including a plurality of light receiving elements arranged in the main scanning direction and a holding circuit that temporarily holds, as pixel data, information of a signal charge generated in each of the plurality of light receiving elements, and is configured to transfer the signal charge accumulated in each of the plurality of light receiving elements to the holding circuit each time the line start signal is inputted, and to reset each of the plurality of light receiving elements by the transfer of the signal charge, and
wherein the line image data is constituted by a group of pixel data corresponding to each of the plurality of light receiving elements.

18. The image reading apparatus according to claim 1,
wherein the image reading apparatus conveys the reading unit as the object in the sub-scanning direction to read the document in a still state.

19. The image reading apparatus according to claim 1,
wherein the image reading apparatus conveys the document as the object in the sub-scanning direction, and uses the reading unit in a fixed state to read the document.

\* \* \* \* \*